INVENTOR.
GERALD F. OLDENBURG
BY
John F. Lahrs
ATTORNEY

INVENTOR.
GERALD F. OLDENBURG
BY
ATTORNEY

United States Patent Office 3,222,532
Patented Dec. 7, 1965

3,222,532
INTERRUPTER CONTROL INCLUDING A PULSE WHICH INHIBITS ERROR SIGNAL TO MITIGATE OVERSHOOT
Gerald F. Oldenburg, Mentor, Ohio, assignor to Bailey Meter Company, a corporation of Delaware
Filed Nov. 1, 1962, Ser. No. 234,620
9 Claims. (Cl. 290—40)

This invention relates to an interrupting type control wherein such interruptions are capable of being over-ridden by large input signals. More specifically this invention relates to an interrupter control for systems having long-time constants.

In control systems having long-time delays between an input change and an output reaction, there exists the possibility of output overshoot. One such system is the control of a turbine generator in the power generation field. These large massive pieces of equipment respond very slowly to an input change. This invention will be described with regards to turbine generator control, but this is not meant as a limitation of my invention.

In a turbine generator the change in power demand is initiated by positioning the synchronizing motor. Depending on the particular system the time delay from the initial input signal to a generator reaction could be a matter of several seconds. During this interval the synchronizing motor is continually positioned as determined by the input signal. When the feedback signal from the turbine finally balances the demand signal and stops the synchronizing motor it is well past the desired demand position. As a result the generator output will be greater than desired and the system will have overcorrected. The system must then recorrect itself and only after several oscillations will the system stabilize at the desired demand output. That such operation is undesirable goes without question.

In the past there have been several methods which have attempted to overcome this oscillatory action, none of which have been completely successful. One of the most obvious is the reduction of system gain. This reduces the generator reaction to an input signal change which in turn reduces the output overshoot. This reduced reaction to a correction is accompanied by an increase in time required for the system to stabilize at the new demand level. Such time delays are not considered desirable.

Another remedy, again somewhat questionable, is the use of small system feedback. That is, feedback from say the synchronizing motor position to the input signal. Such feedback would reduce the time lag from the input signal to feedback balancing but would not guarantee the generator was producing the demand required. True the demand signal would be balanced by the position signal from the synchronizing motor, but this is no assurance that the required generator demand has been met. Between the synchronizing motor and the generator there are a number of mechanical linkages and hydraulic valves any of which can introduce an error. As anyone who is familiar with turbines will know these systems can become dirty and sticky resulting in operation at a different position during each movement.

It is therefore an object of my invention to describe an interrupter control which will allow systems with long-time constants to reposition as quickly as possible without overshoot.

It is also an object of my invention to provide an interrupter control that can be over-ridden by a large input signal. This further allows the system to reposition as quickly as possible.

Still another object of my invention is to provide an interrupter control that will operate a turbine generator control system at a high gain and use complete system feedback. Operating with my control the generator demand will be met as quickly as possible with no overshoot.

These and other objects set forth herein above will become more apparent from a description of the drawings wherein.

Figure 1:
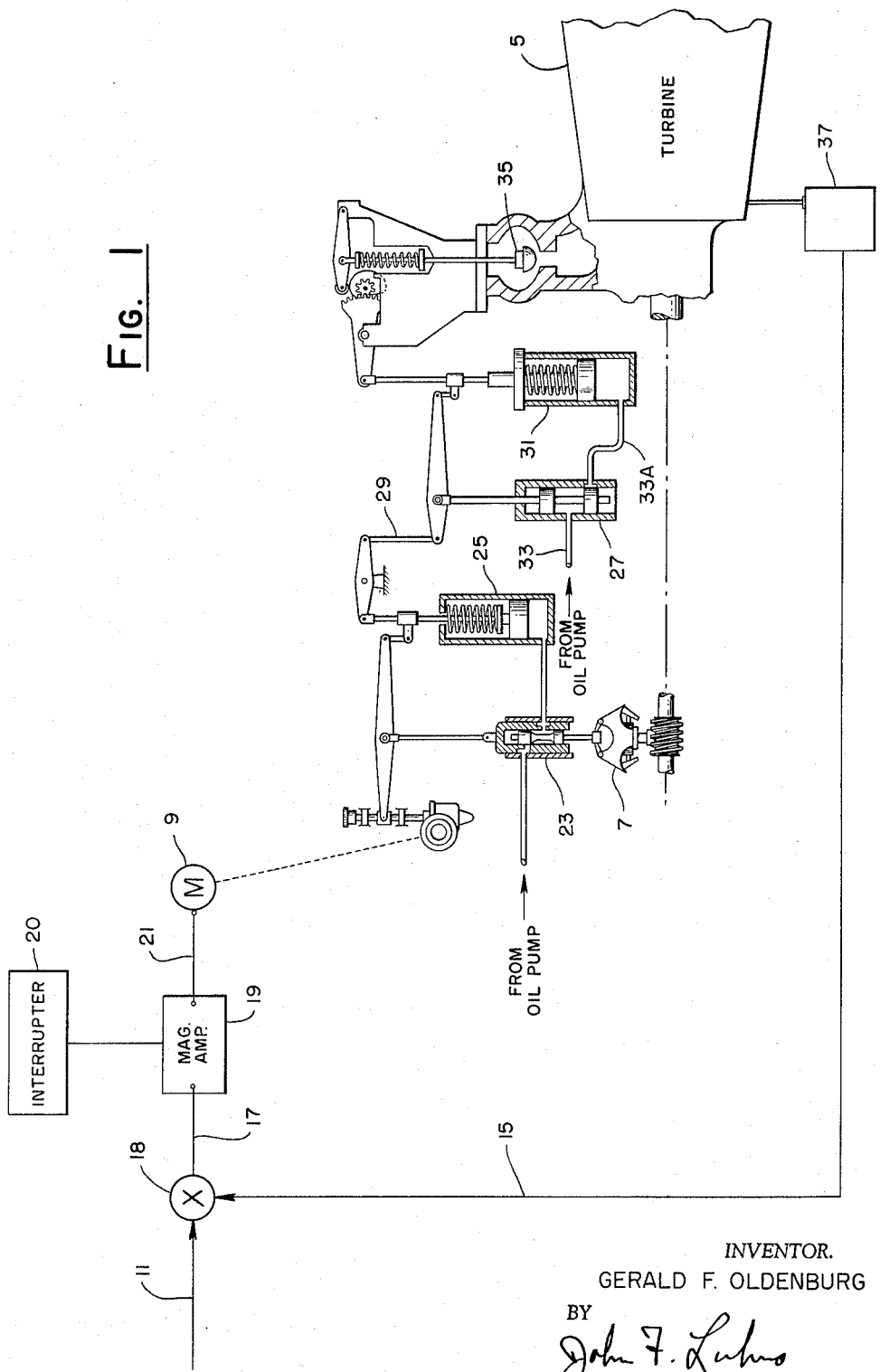
FIG. 1 is a schematic layout of the complete turbine generator control system including my interrupter control.

Referring now to FIG. 1, I therein show a turbine 5, centrifugal speed governor 7, a synchronizing motor 9 and the associated hydraulic system for controlling the turbine. This system will operate at a high gain and incorporates complete system feedback. That is, feedback from the first stage of the turbine which is used to indicate generator output. It is well known to those skilled in the art that first stage turbine pressure may be taken as an indication of generator output. Consider now that a new demand level is called for and this demand change is in the form of a change in voltage signal. This signal is applied to a summing junction 13 through line 11. The summing junction 13 algebraically adds the demand signal with the feedback signal transmitted through line 15. The difference between these two voltages will be the error signal applied to a magnetic amplifier 19 through line 17. Depending on the operational condition of a unijunction multi-vibrator switch 20 the error signal will be either amplified or blocked by the magnetic amplifier 19. When the unijunction multi-vibrator switch 20 is in its closed position any error signal less than the inhibit level will be blocked at the magnetic amplifier. This will be explained more fully below. When the unijunction multi-vibrator switch 20 is in the open position any error signal will be amplified by the magnetic amplifier 19.

Figure 3:
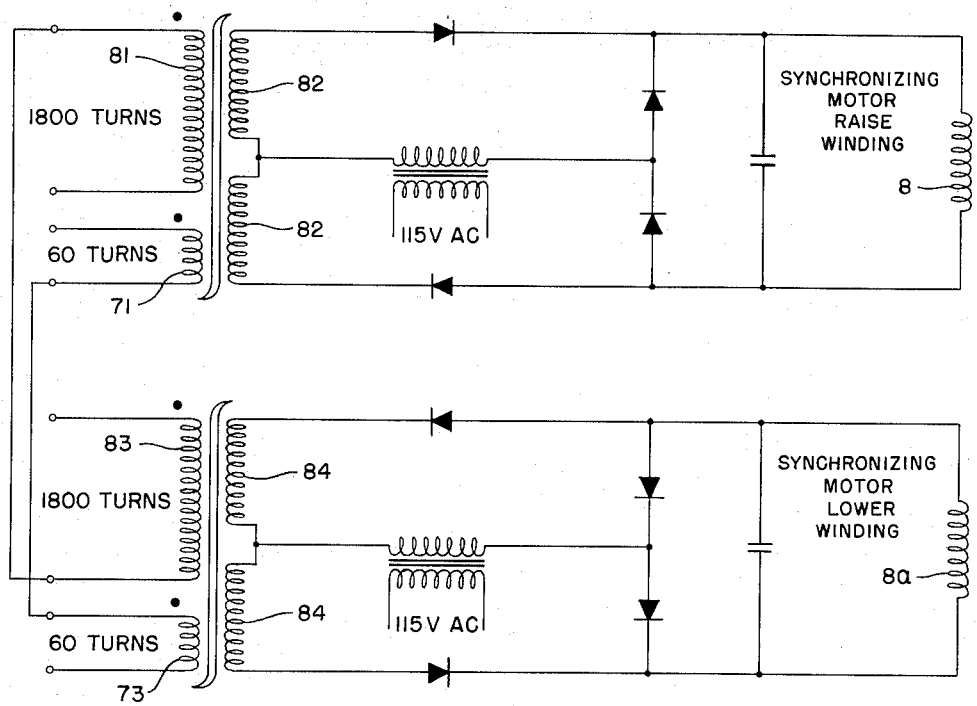
FIG. 3 is a schematic of the magnetic amplifier.

The amplified error signal energizes motor winding 8 or 8a, as shown in FIG. 3, of the synchronizing motor 9 through line 21. The synchronizing motor 9 positions a primary pilot valve 23. In turn a primary relay 25 is activated by movement of the primary pilot valve 23. The primary relay 25 positions a main pilot valve 27 through linkage 29. Positioning of the main pilot valve 27 permits hydraulic fluid to position a main piston 31 through pipe 33 and 33a. Positioning of the main piston 31 changes the steam flow through the steam control valves 35. As more or less steam is passed through the steam control valves 35 the speed and/or the load carried by the turbine is changed. The level of this new load is measured by steam pressure transmitter 37 at the turbine's first stage. Steam pressure transmitter 37 can be any one of several types all well known to those skilled in the art. The electrical signal from the steam pressure transmitter 37 is transmitted to the summing junction 13 through line 15. The difference between the demand signal and the first stage pressure signal at the summing junction 13 is the error signal applied to the magnetic amplifier 19 as explained previously.

Figure 2:
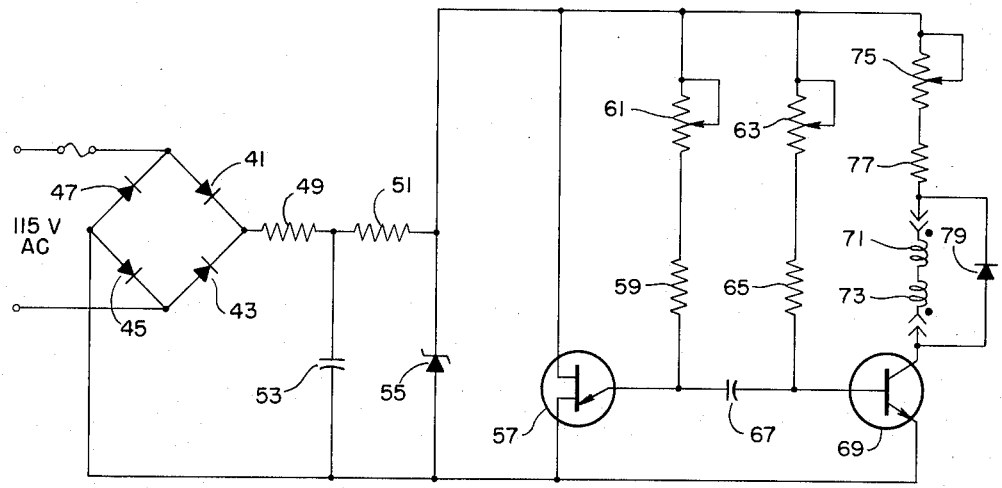
FIG. 2 is a schematic of the interrupter control switch.

The previous discussion assumed the unijunction multi-vibrator switch 20 was in an open position. When the unijunction multi-vibrator switch 20 is not inhibiting the magnetic amplifier 19 it is in its open position. When the unijunction multi-vibrator switch 20 is closed the magnetic amplifier 19 is inhibited from amplifying signals less than the inhibit level. FIG. 2 is a schematic diagram of a typical unijunction multi-vibrator switch which consists of three main sections. These three sections can be designated the power supply, the multi-vibrator and the solid state switch. The power supply section incorporates a full wave bridge consisting of diodes 41, 43, 45 and 47. This section also includes an R-C filter comprising resistors 49 and 51, and capacitor 53. Voltage regulation of this supply is a function of the Zener diode 55. The power supply section merely supplies a regulated D.-C. drive and bias voltage. The multi-vibrator section consists of a unijunction transistor 57, resistors 59, 61, 63 and 65, and a capacitor 67. The third section, a solid state switch, is composed of a transistor 69, magnetic amplifier inhibit coils 71 and 73, resistors 75 and 77, and diode 79.

In describing the operation of the unijunction multi-vibrator switch 20 it will be assumed that transistor 69 is initially conducting in a saturated condition. The load in the collector circuit of transistor 69 includes resistors 75 and 77 and the magnetic amplifier inhibit coils 71 and 73. Resistor 75 is an adjustable resistor, such as a potentiometer, for varying the current in the collector circuit of transistor 69. With transistor 69 in the conducting state current will flow through the magnetic amplifier inhibit coils 71 and 73. Under these conditions the magnetic amplifier 19 is inhibited from amplifying the error signal and the synchronizing motor 9 will not position. That is unless the error signal is greater than the inhibit level as will be explained presently. Voltage for the base drive of transistor 69 is supplied through resistors 63 and 65 and is sufficient to insure saturation.

During the conduction of transistor 69 the negative side of capacitor 67 is clamped at the base potential of this transistor, which is near zero. Capacitor 67 is now charged through resistors 59 and 61 until the potential on its positive side reaches the firing voltage of the unijunction transistor 57. When the positive side of capacitor 67 reaches the firing voltage of transistor 57 this transistor begins to conduct. The time between the instant transistor 69 conducts and the instant the unijunction transistor 57 conducts is the closed position and as will be shown later determines the de-energized cycle of synchronizing motor 9. This charge time can be varied by means of resistor 61 which is of a variable type. As the voltage on the positive side of capacitor 67 reaches the firing voltage, transistor 57 goes through a negative resistance region and its emitter voltage falls to the transistor "on-voltage." This voltage drop, from the firing voltage to the on-voltage, is reflected to the base of transistor 69 through capacitor 67. The magnitude of this voltage drop is sufficient to interrupt conduction of transistor 69.

With the positive side of capacitor 67 at the on-voltage of transistor 57 and transistor 69 in a non-conducting state, capacitor 67 will again begin to charge, this time through resistors 63 and 65. Capacitor 67 will continue to charge until transistor 69 is again forward biased and conducting. As transistor 69 begins to conduct the capacitor 67 quickly discharges through the emitter-base circuits of the unijunction transistor 57 and transistor 69. When the positive side of capacitor 67 discharges to about 2 volts the unijunction transistor 57 is cut off. Capacitor 67 now charges through resistors 59 and 61 and the switching cycle is complete.

Whereas the time during the conduction of transistor 69 is the closed position, the period when the unijunction transistor 57 is conducting is the open position. It is during the open position that the synchronizing motor 9 will be positioned. The open position time is adjustable by means of variable resistor 63.

The magnetic amplifier inhibit windings 71 and 73 are also shown in the schematic diagram of the magnetic amplifier 19 as shown in FIG. 3. In addition to the inhibit winding, the magnetic amplifier also incorporates two control windings 81 and 83, and two sets of output windings 82 and 84. As indicated in FIG. 3 the control windings have 1800 turns and the inhibit windings 60 turns. Control windings 81 and 83 are connected in such selected relationship to the inhibit windings 71 and 73 that a positive current applied to both windings produces an opposing magnetic flux in the amplifier core. As a result the control windings are ineffective in controlling the magnetic amplifier output until they overcome the M.M.F. effect of the inhibit windings. The inhibit windings, therefore, can be used to determine the magnitude of the error signal required to continually drive the synchronizing motor 9.

In describing the operation of the magnetic amplifier 19 it will be first assumed no error signal exists at the summing junction 13. Under these conditions the output of the amplifier is zero. If the inhibits windings are energized during this period the output cannot be affected. The effect of the inhibit winding would be to merely increase the reactance of the output windings 82 and 84 which is already at its maximum. If next it is assumed that an error signal does exist then the M.M.F. developed by the inhibit windings will be in opposition to the M.M.F. developed by the control windings. When the M.M.F. developed by the control windings is greater than that developed by the inhibit windings an output voltage will result. This greater effect by the control windings will reduce the reactance of the amplifier output windings and depending on the polarity of the error signal will either raise or lower the position of the synchronizing motor 9. When the M.M.F. developed by the current in the control windings is less than that of the inhibit windings the reactance of the output windings will remain at a maximum and the output of the magnetic amplifier will be zero. For example, by adjusting resistor 75 so the collector current of transistor 69 is 30 milliamperes then the ampere turn magnetizing effect of the inhibit windings will be 1.8 ampere turns. If the error signal at the summing junction 13 causes a .5 milliampere current to flow through the control windings there will be generated a .9 ampere turn effect on the amplifier. This is not sufficient to overcome the inhibit winding magnetizing effect and consequently the magnetic amplifier output will be zero and the synchronizing motor 9 will not position. If the error signal causes a 2 milliamp current to flow through the control windings then the effect will be 3.6 ampere-turns and the magnetic amplifier will drive the synchronizing motor. This discussion assumes the inhibit windings are continually energized.

In the operation of my control system the inhibit windings are cycled between an energized and de-energized state. When the unijunction multi-vibrator switch 20 is in the closed position transistor 69 is conducting and the inhibit windings are energized. When the unijunction multi-vibrator switch 20 is in the open position transistor 69 is non-conducting and the inhibit windings are de-energized. If the former condition is assumed then a 1.8 ampere-turn magnetizing effect on the inhibit windings will be greater than a .9 ampere-turn effect on the control windings and the magnetic amplifier output will be zero. When the inhibit windings are de-energized the .9 ampere-turn effect of the control windings will cause a magnetic amplifier output and the synchronizing motor 9 will position. The on and off time of the synchronizing motor 9 can be adjusted by means of resistors 61 and 63.

Summarizing the operation of the magnetic amplifier if the ampere-turn effect of the control winding is greater than the inhibit windings the synchronizing motor 9 will operate continuously. If the ampere-turn effect of the control winding is less than the inhibit winding the synchronizing motor will operate only when the inhibit windings are de-energized. The time for energization and de-energization of these windings being adjustable by means of resistors 61 and 63 of the interrupter 20.

*Description of operation*

Referring now to FIGS. 1, 2 and 3 I will now detail the operation of my system. When the system calls for a demand increase from a particular generator, the increase will be in the form of an electrical signal applied to the summing junction 13. An error signal now exists at the summing junction 13 between the demand signal and the feedback signal. This error signal causes current to flow through the control windings of the magnetic amplifier 19. If the ampere-turn effect of this error signal is greater than the effect of the inhibit winding the result will be a magnetic amplifier output. This output drives the synchronizing motor 9 continuously which positions the primary pilot valve as described with reference to FIG. 1. In turn this will position the steam control valves 35 to increase or decrease the steam flow to the turbine 5 depending upon whether the error signal is positive or negative. The change in steam flow is detected by the first stage steam pressure transmitter 37 which then changes the feedback signal in line 15. The time for this cycle is several seconds and without the use of my invention the demand for the generator would eventually over-shoot. As the steam flow in the first stage of the turbine 5 changes, the error signal at the summing junction 13 will decrease. This will cause the current to the magnetic amplifier control winding to decrease.

Eventually the ampere-turn effect of the control winding will be less than that of the inhibit winding and the magnetic amplifier output will be zero when the inhibit windings are energized. If I now adjust the inhibit windings to be de-energized for .5 second and energized for 2 seconds then the amplifier output will exist for .5 second. That is, when the inhibit winding is de-energized. During this .5 second the primary pilot valve 23 will position and the first stage steam pressure will change. Before the next de-energized cycle of the inhibit winding the feedback signal will correct the error signal by an amount equal to the previous correction and the magnetic amplifier output will be reduced. Consequently the steam flow change in the first stage of turbine 5 will be less on the next cycle. This continues until no error signal exists between the demand signal and the feedback signal at summing junction 13.

Figure 4:
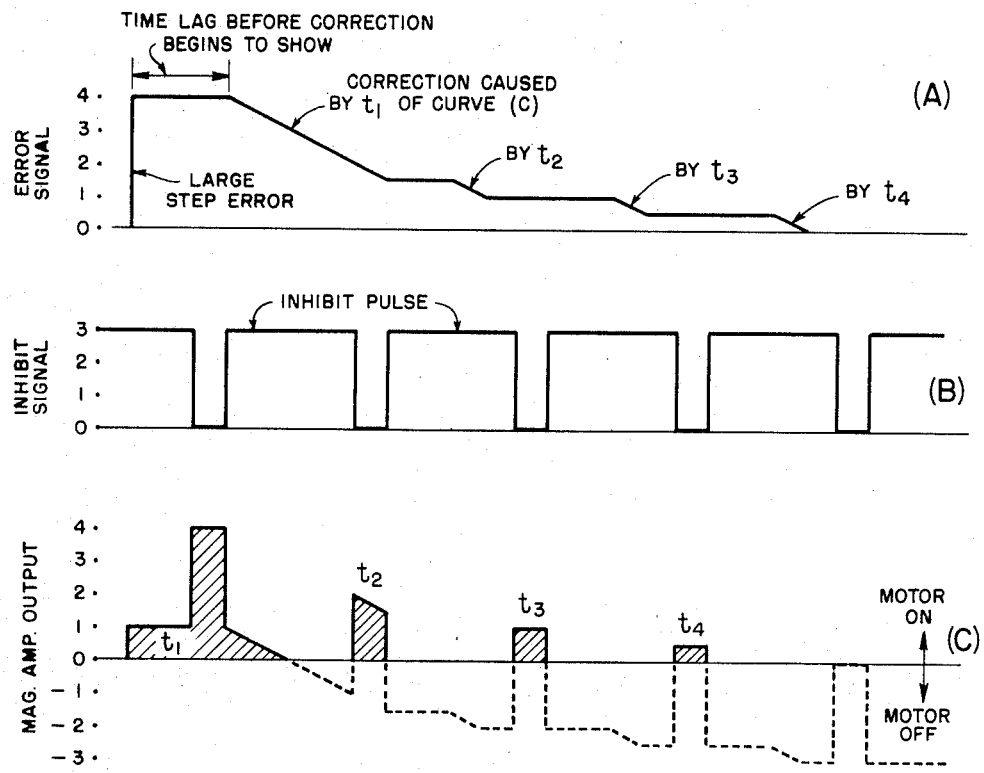
FIG. 4 shows three curves indicating the error signal to the magnetic amplifier, inhibit pulses to interrupt the error signal, and the resultant signal applied to the synchronizing drive.

Referring now to FIG. 4, I graphically show the operation of the interrupter control system. Included are curves of the magnetic amplifier output signal, the summing junction difference voltage or error signal, and the interrupter or inhibit winding signal. Curve A shows an error signal with an initial step change. Curve B shows the interrupter or inhibit winding signal and curve C represents the magnetic amplifier output signal. Curve C also represents the time when the synchronizing motor is positioning. Graphically curve C represents the difference between curve A and curve B. In discussing these curves the same sequence will be followed in regards to correcting the error signal as was set forth in the previous description. The vertical scale on all three curves is equal when referred to a common base. Curve A represents a step change of greater magnitude than the inhibit signal of curve B. This results in a plus difference as shown in curve C. A plus difference indicates the synchronizing motor is positoning. The synchronizing motor continues to operate at a constant speed until the interrupter signal steps to zero. When the interrupter signal steps to zero the difference signal of curve C is equal in magnitude to the error signal of curve A, and the speed of the synchronizing motor may change. At the same time the interrupter signal steps to its inhibit level the original correction begins to reduce the magnitude of the error signal. This is shown by the ramp decline of curve A and curve C. The synchronizing motor is still operating because the difference is plus, but its speed is being decreased. As the error signal of curve A continues to decrease in magnitude it eventually becomes less than the inhibit signal of curve B. At such time the difference signal of curve C goes negative and the synchronizing motor stops. The synchronizing motor will continue stopped until the inhibit signal steps to zero. The difference voltage is again positive and the synchronizing motor will operate. This sequence continues until the difference signal is always negative when the inhibit signal is zero.

Without the interrupting control the synchronizing motor would drive constantly until the error signal is zero. Due to the several second lag inherent in the system the generator output would overshoot. This would cause the synchronizing motor to operate in the reverse direction with the result being an oscillating output. Using the system herein described the synchronizing motor changes position in accordance with the uninhibited error signal and the system begins its response to this change. The synchronizing motor then stops when the error signal is inhibited and the previous position change alters the output of the turbine. A correction in the turbine output in turn reduces the error signal. In this manner the generator demand does not overshoot because the synchronizing motor only operates to correct a steady state system, and then only in decreasing smaller steps.

Figure 5:
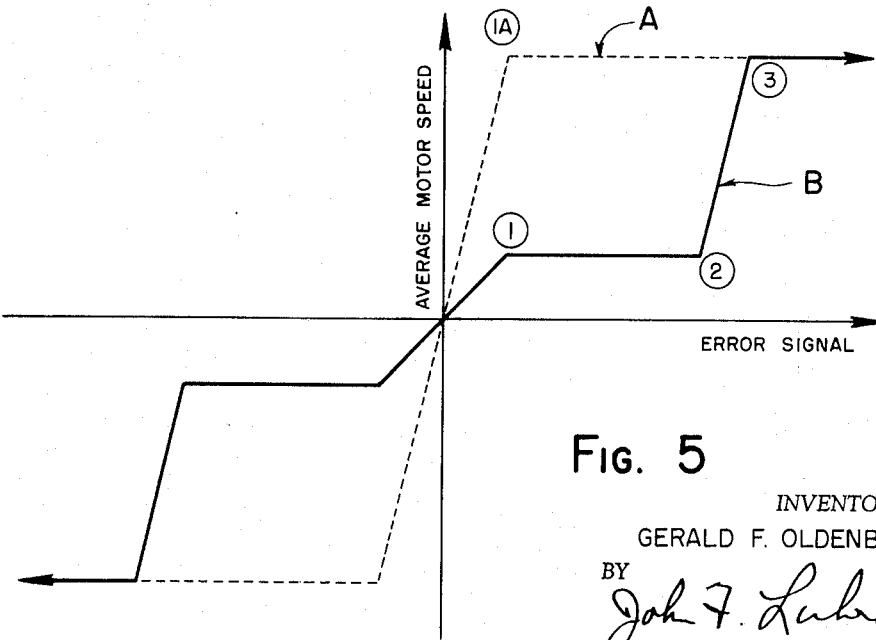
FIG. 5 is a curve showing the average motor speed vs. the magnitude of the error signal both with and without the interrupter circuit.

Whereas FIG. 4 shows the cyclic operation of the synchronizing motor it does not prevent all the advantages of the interrupter control. It fails to show that average motor speed is less using an interrupter control system. A lower average motor speed will apply a smaller correction to the turbine with less chance of overshoot. FIG. 5 represents a plot of average motor speed versus magnitude of error signal.

Referring now to FIG. 5 I show the plot of average motor speed without the interrupter with a dotted line curve and average motor speed with the interrupter as a solid line curve. From the intersection of the axis to point 1A the average motor speed without the interrupter is proportional to the magnitude of the error. That is, for a small error signal the magnetic amplifier does not saturate and the output is proportionate to the input. After point 1A the average motor speed is constant regardless of the magnitude of the error signal. From this point on the magnetic amplifier is saturated. Considering now the curve representing the system with the interrupter circuit, the average motor speed is proportional to the error signal up to point 1, again because the amplifier is not saturated. With the interrupter circuit the average motor speed is lower because of intermittent operation. When the error signal is greater than that represented by point 1 the average motor speed is constant until the error signal is greater in magnitude than the inhibit winding signal as represented by point 2. Any error signal greater than point 1 will saturated the amplifier as pointed out in regards to the curve indicating operation without the interrupter. Again, the average motor speed is lower because of intermittent motor operation. As the error signal continues to increase from point 2 the average motor speed begins to increase proportionate to the amount of error signal greater than point 2. When the error signal reaches point 3 the average motor speed will be equal in magnitude to the motor speed in a system without an interrupter. This is the result of the magnetic amplifier being saturated continuously as if there were no interrupter. From point 2 to point 3 the synchronizing motor is on at all times, but the magnetic amplifier is not saturated during the inhibit pulse. This explains why the average motor speed does not immediately step to the final level.

Although points 1 and 3 cannot be changed because they are determined by the design of the magnetic amplifier there can be an adjustment of point 2. Point 2, as mentioned before, represents the point where the error signal sxceeds the inhibit winding signal. This point can be adjusted by adjusting the curent flow to the inhibit windings 71 and 73. Adjusting the current flow in the inhibit winding is a function of resistor 75 and the unijunction multi-vibrator switch 20 as explained previously.

It should now be apparent that when a system as herein described is applied to the control of a turbine generator little or no overshoot will be experienced. The synchronizing motor only positions after the system has responded to the previous correction. In addition when the motor does operate the average motor speed is lower which permits smaller corrections, all of which makes for less possible oscillating action.

While only one embodiment of my invention has been described herein other embodiments will be readily understood by those skilled in the art.

What I claim as new and desire to secure by Letters Patent of the United States is:

1. Apparatus for controlling the energy input to a turbine generator, comprising in combination, a summing junction for algebraically adding two independent electrical signals, the sum of said signals being designated an error signal; a magnetic amplifying means including an output winding and a pair of oppositely wound input windings, the first of said input windings being connected to receive the error signal from said summing junction, a unijunction multi-vibrator switch cyclically operating in an open or closed position, said second input winding of said magnetic amplifying means being connected to said switch so as to be energized when said switch is in the closed position, said second winding being operably connected to inhibit amplification of small error signals when said second winding is energized, a synchronizing motor positioning means including a motor winding connected to the output widing of said magnetic amplifying means, said motor winding being energized by the uninhibited amplified error signal, valve means actuated by said positioning means for controlling the energy input to the turbine generator, and means responsive to the energy output of said turbine for generating an electrical signal proportional thereto, said proportional electrical signal being one of the two input signals to said summing junction.

2. In a control system for regulating the energy input to a turbine generator, comprising in combination, a summing junction for adding two independent electrical signals, the sum of said signals being designated an error signal; a magnetic amplifying means including an output winding and a pair of oppositely wound input windings, the first of said input windings being connected to receive the error signal of said summing junction thereby developing an M.M.F. proportional to said error signal, a unijunction multi-vibrator switch cyclically operating in an open or closed position, said second input winding of said magnetic amplifier means being connected to said switch so as to be energized when said switch is in the closed position, a means within said unijunction multi-vibrator switch for adjusting the M.M.F. effect of said second input winding on said magnetic amplifier, said second winding being operably connected to inhibit the amplification of an error signal producing an M.M.F. less than said second input winding, a synchronizing motor positioning means including a winding connected to the output winding of said magnetic amplifying means, said winding being energized by the uninhibited amplified error signal, a control drive means actuated by said positioning means for controlling the energy input to the turbine generator, and means responsive to the energy output of said turbine for generating an electrical signal proportional thereto, said proportional electrical signal being one of two independent signal inputs to the summing junction, the other of said independent signals being a system input signal.

3. In a control system for regulating the energy input to a turbine generator, comprising in combination, a summing junction for adding two independent electrical signals, the sum of said signals being designated an error signal; magnetic amplifying means including an output winding and a pair of oppositely wound input windings, the first of said input windings being connected to receive the error signal of said summing junction thereby developing an M.M.F. proportional to said error signal, a unijunction multi-vibrator switch cyclically operating in an open or closed position, means for adjusting the timing of the open and closed position of said switching means, said second input winding of said magnetic amplifying means being connected to said switch so as to be energized when said switch is in the closed position, means within said unijunction multi-vibrator switch for adjusting the M.M.F. effect of said second input winding of said magnetic amplifier, said second winding being operably connected to inhibit the amplification of that error signal producing an M.M.F. less than said second winding, a synchronizing motor positioning means including a winding connected to the output winding of said magnetic amplifier means, said winding being energized by the uninhibited amplified error signal, a control drive means actuated by said positioning means for controlling the energy input to the turbine generator, and means responsive to the energy output of said turbine for generating an electrical signal proportional thereto, said proportional electrical signal being one of two independent signal inputs to said summing junction, the other said independent signal being the system input signal.

4. Apparatus for controlling the energy input to a turbine generator, comprising in combination, a summing junction for algebraically adding two independent electrical signals, the sum of said signals being designated an error signal; a magnetic amplifying means including a pair of oppositely wound input windings and a pair of output windings, the first of said input windings being connected to receive the error signal from said summing junction, a unijunction multi-vibrator switch cyclically operating in an open or closed position, said second input winding of said magnetic amplifying means being connected to said switch so as to be energized when said switch is in the closed position, said second winding being operably connected to inhibit amplification of small error signals when said second winding is energized, a source of A.-C. current supplying a full-wave diode bridge, said output windings of said magnetic amplifying means connected in opposite legs of said diode bridge, said output windings forming a high-reactance path when said input windings are de-energized, a synchronizing motor positioning means including motor windings connected to the output of said diode bridge, said motor windings being energized by the uninhibited amplified error signal, valve means actuated by said positioning means for controlling the energy input to the turbine generator, and means responsive to the energy output of said turbine for generating an electrical signal proportional thereto, said proportional electrical signal being one of two independent signal inputs to said summing junction, the other said independent signal being the system input signal.

5. Apparatus for controlling the energy input to a turbine generator, comprising in combination, a summing junction for algebraically adding two independent electrical signals, the sum of said signals being designated an error signal; a magnetic amplifying means including an output winding and a pair of oppositely wound input windings, a second magnetic amplifying means also including an output winding and a pair of oppositely wound input windings, the first of said input windings of said magnetic amplifying means being serially connected in opposite polarity to receive the error signal from said summing junction, a unijunction multi-vibrator switch cyclically operating in an open or closed position, said second input winding of said magnetic amplifying means being serially connected in opposition to said switch so as to be energized when said switch is in the closed position, said second winding being operably connected to inhibit amplification of small error signals when said second windings are energized, the first of said magnetic amplifying means being connected to amplify positive error signals, the second of said magnetic amplifying means being connected to amplify negative error signals, a synchronizing motor positioning means including a pair of motor windings, the first of said motor windings being connected to the output winding of said first magnetic amplifying means, the second of said motor windings being connected to the output winding of said second magnetic amplifying means, said motor windings being energized by the uninhibited amplified error signal, valve means for controlling the energy input to the turbine generator, said valve means actuated by said positioning means in a direction determined by the polarity of the error signal, and means responsive to the energy output of said turbine for generating an electrical signal proportional thereto, said proportional electrical signal being one of the two independent inputs to said summing junction, the other said independent signal being the system input signal.

6. Means for controlling the energy input to a turbine generator, comprising in combination, a summing junction for algebraically adding two independent electrical signals, the sum of said signals being designated an error signal; a magnetic amplifying means including two output windings and a pair of oppositely wound input windings, a second magnetic amplifying means including a pair of output windings and a pair of oppositely wound input windings, the first of said input windings of said magnetic amplifying means being serially connected in opposite polarity to receive the error signal from said summing junction, a unijunction multi-vibrator switch cyclically operating in an open or closed position, said second input windings of said magnetic amplifying means serially connected in opposition to said switch so as to be energized when said switch is in a closed position, said second windings being operably connected to inhibit amplification of small error signals when said second windings are energized, the first of said magnetic amplifying means being connected to amplify positive error signals, the second of said magnetic amplifying means being connected to amplify negative error signals, a source of A.-C. current supplying a full-wave diode bridge, said output windings of first said magnetic amplifying means connected in opposite legs of said diode bridge, said output windings forming a high reactance path when said input windings are de-energized, a second source of A.-C. current supplying a full-wave bridge, said output windings of said second magnetic amplifying means connected in opposite legs of said diode bridge, said output windings forming a high reactance path when said input windings are de-energized, a synchronizing motor positioning means including a pair of motor windings, the first of said motor windings being connected to the output of said diode bridge associated with the first of said magnetic amplifying means, the second of said motor windings being connected to the output of said diode bridge associated with said second magnetic amplifying means, said motor windings being energized by the uninhibited amplified error signal, valve means for controlling the energy input to the turbine generator, said valve means actuated by said positioning means in a direction determined by the polarity of the error signal, and means responsive to the energy output of said turbine for generating an electrical signal proportional thereto, said proportional electrical signal being one of two independent signal inputs to said summing junction, the other said independent signal being the system input signal.

7. In a control system for regulating the energy input to a turbine generator, comprising in combination, a summing junction for algebraically adding two independent electrical signals, the sum of said signals being designated an error signal; a magnetic amplifying means including an output winding and a pair of oppositely wound input windings, a second magnetic amplifying means also including an output winding and a pair of oppositely wound input windings, the first of said input windings of said magnetic amplifying means serially connected in opposite polarity to receive the error signal from said summing junction thereby developing an M.M.F. proportional to said error signal, a unijunction multi-vibrator switch cyclically operating in an open or closed position, said second input windings of said magnetic amplifying means being serially connected in opposition to said switch so as to be energized when said switch is in the closed position, a means within said unijunction multi-vibrator switch for adjusting the M.M.F. effect of said second input windings on said magnetic amplifiers, said second windings being operably connected to inhibit the amplification of an error signal producing an M.M.F. less than said second windings, the first of said magnetic amplifying means being connected to amplify positive error signals, the second of said magnetic amplifying means being connected to amplify negative error signal, a synchronizing motor positioning means including a pair of motor windings, the first of said motor windings being connected to the output winding of the first of said magnetic amplifying means, the second of said motor windings being connected to the output winding of said second magnetic amplifying means, said motor windings being energized by the uninhibited amplified error signal, a control drive means for controlling the energy input to a turbine generator, said control drive means actuated by said positioning means in a direction determined by the polarity of the error signal, and a pressure transmitter responsive to first stage turbine pressure generating an electrical signal proportional thereto, said proportional electrical signal being one of two independent signal inputs to said summing junction, the other said independent signal being the system input signal.

8. A magnetic amplifier interrupter control system, comprising in combination, a magnetic amplifier including an output winding and a pair of oppositely wound input windings, a second magnetic amplifier also including an output winding and a pair of oppositely wound input windings, the first of said input windings of said magnetic amplifiers being serially connected in opposite polarity to receive a first input signal thereby developing an M.M.F. in said magnetic amplifiers proportional to said input signal, a unijunction multi-vibrator switch cyclically operating in an open or closed position thereby generating a second input signal, the second of said input windings of said magnetic amplifiers also serially connected in opposition and as such connected to said unijunction multi-vibrator switch, said second input windings being connected to receive a second input signal thereby developing an M.M.F. proportional to said second input signal, the M.M.F. produced by each of said second input windings being in opposition to the M.M.F. produced by each of said first input windings of their respective magnetic amplifiers, the reactance of said output windings being varied in accordance with the M.M.F. produced by said first input windings in excess of that produced by said second input windings, the reactance of the output windings of one of said magnetic amplifiers being unchanged and at a maximum, the reactance of the output windings to the second of said magnetic amplifiers being proportional to the input signal, the polarity and magnitude of the output voltage of said magnetic amplifiers being proportional to the reactance of said output winding.

9. A magnetic amplifier interrupter control system, comprising in combination, a magnetic amplifier including a pair of output windings and a pair of oppositely wound input windings, a second magnetic amplifier also including a pair of output windings and a pair of oppositely wound input windings, the first of said input windings of said magnetic amplifiers being serially connected in opposite polarity to receive a first input signal thereby developing an M.M.F. in said magnetic amplifier proportional to said input signal, a unijunction multi-vibrator switch cyclically operating in an open or closed position thereby generating a second input signal, the second of said input windings of said magnetic amplifiers also serially connected in opposition and as such connected to said unijunction multi-vibrator switch, said second input windings being connected to receive a second input signal thereby developing a M.M.F. proportional to said second input signal, the M.M.F. produced by each of said second input windings being in opposition to the M.M.F. produced by each of said first input windings of their respective magnetic amplifiers, a source of A.-C. current supplying a full-wave diode bridge, said output windings of said first magnetic amplifier being connected in opposite legs of said diode bridge, said output windings forming a high reactance path when said input windings are de-energized, a second source of A.-C. current supplying a second full-wave diode bridge, said output windings of said second magnetic amplifier being connected in opposite legs of said diode bridge, said output windings forming a high reactance when said input windings are de-energized, the reactance of the output windings of one of said magnetic amplifiers being unchanged and at a maximum, the reactance of the output winding of the other of said magnetic amplifiers being proportional to the input signal, the polarity and magnitude of the output voltage of said magnetic amplifiers being proportional to the reactance of said output windings.

References Cited by the Examiner
UNITED STATES PATENTS

| | | | |
|---|---|---|---|
| 2,909,723 | 10/1959 | Scorgie | 323—89.1 |
| 2,955,243 | 10/1960 | Lyons et al. | 318—513 |
| 2,964,690 | 12/1960 | Stillings | 318—513 |
| 3,021,474 | 2/1962 | Byloff | 318—513 |

ORIS L. RADER, *Primary Examiner.*